No. 611,550. Patented Sept. 27, 1898.
E. ASHMAN.
NUT LOCK.
(Application filed July 18, 1896.)
(No Model.)
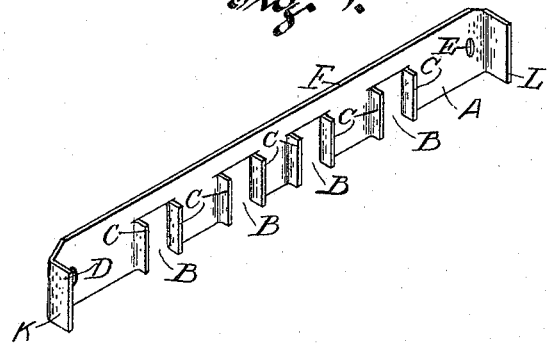
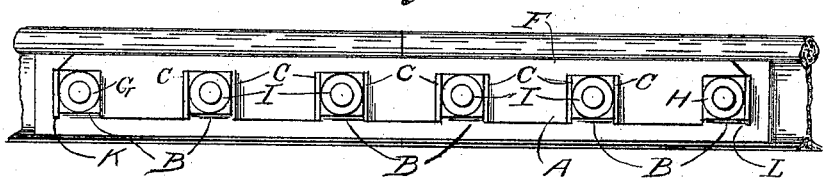
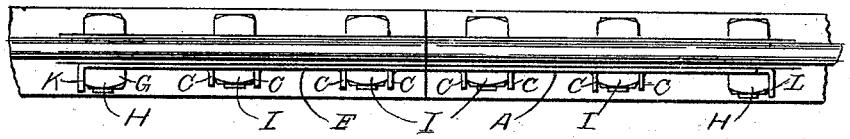
Witnesses
Inventor,
Edward Ashman,
by John Wedderburn
Attorney

UNITED STATES PATENT OFFICE.

EDWARD ASHMAN, OF McKEESPORT, PENNSYLVANIA.

NUT-LOCK.

SPECIFICATION forming part of Letters Patent No. 611,550, dated September 27, 1898.

Application filed July 18, 1896. Serial No. 599,623. (No model.)

*To all whom it may concern:*

Be it known that I, EDWARD ASHMAN, a citizen of the United States, residing at McKeesport, in the county of Allegheny and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to nut-locks.

My object is to provide an extremely simple and cheap nut-lock which will be adapted to lock a series of nuts in position on their bolts in a highly superior manner and one which can be quickly and easily applied or removed.

My improved nut-lock is especially adaptable for use in connection with nuts and bolts passing through the contiguous ends of rails and the fish-plate joining the same; and it consists of a plate provided with a series of openings adapted to receive the intermediate nuts and has flanges to prevent said nuts from turning, being also provided with openings at its end portions for the reception of the end bolts, the extreme ends of the plate being adapted to be bent up, so as to retain the end nuts in position.

In the accompanying drawings, Figure 1 is a perspective detail view of my improved nut-lock. Fig. 2 is a side elevation showing my improved nut-lock in use in connection with the fish-plate and its bolts and nuts, and Fig. 3 a plan view.

My improved nut-lock consists of a plate A, which is provided with a series of openings B to receive the intermediate nuts, and the metal of which the plate is composed is bent up into sets of flanges C, which are located on opposite sides of each opening. At the ends of the plate there are holes D and E. The upper portion F of the plate rests against the fish-plate and the under side of the head of the rail. My improved nut-lock is placed in position in the following manner:

The nuts G and H of the end bolts are first removed and the plate A pressed back against the fish-plate. The intermediate nuts I are then straightened and the nut-lock applied so that the nuts will lie in the openings and between the flanges, while the end bolts are passed through openings D and E. After the end nuts G and H have been screwed on their bolts the extreme ends of the plate are bent up into flanges K and L, so that all the nuts will be held locked against turning in the slightest degree. The nut-lock can be quickly and easily removed whenever desirable.

It is obvious that slight and immaterial changes might be made in its construction, so as to make it adaptable to any shape of nut, and hence it is to be understood that I do not limit myself to the use of the square openings and straight flanges shown, but consider that I am entitled to all such variations as come within the spirit and scope of my invention.

Having now described my invention, what I claim as new, and desire to secure by Letters Patent, is—

As a new article of manufacture, a nut-lock consisting of a plate having apertures therein for the reception of the end bolts of a series, located adjacent to the opposite ends of said plate, lips on the ends of said plate adapted to be bent upwardly forming flanges for preventing the turning of the nuts on said end bolts, and a series of intermediate open slots leading from the lower edge of said plate upwardly and flanges upon the opposite sides of said slots, the nuts on the intermediate bolts of the series being adapted to fit within said slots, as and for the purpose set forth.

In testimony whereof I have signed this specification in the presence of two subscribing witnesses.

EDWARD ASHMAN.

Witnesses:
GEO. M. McCLEARY,
S. S. SELWAY.